(12) United States Patent
Yamato et al.

(10) Patent No.: US 8,576,508 B2
(45) Date of Patent: Nov. 5, 2013

(54) TAPE LIBRARY SYSTEM AND METHOD OF DIAGNOSING TAPE CARTRIDGES

(75) Inventors: Takaaki Yamato, Kawasaki (JP); Shigeru Tsukada, Kawasaki (JP); Nobuyuki Hirashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 12/817,442

(22) Filed: Jun. 17, 2010

(65) Prior Publication Data

US 2011/0141597 A1 Jun. 16, 2011

(30) Foreign Application Priority Data

Jun. 25, 2009 (JP) ................................. 2009-151526

(51) Int. Cl.
*G11B 19/02* (2006.01)
(52) U.S. Cl.
USPC ............................................................ 360/69
(58) Field of Classification Search
None
See application file for complete search history.

(56) References Cited

U.S. PATENT DOCUMENTS

| | | | | |
|---|---|---|---|---|
| 5,949,342 A * | 9/1999 | Frary et al. | .................... | 340/665 |
| 6,614,611 B1 | 9/2003 | Zweighaft | | |
| 6,633,454 B1 * | 10/2003 | Martin et al. | ................. | 360/132 |
| 7,472,245 B2 * | 12/2008 | Camble et al. | ................ | 711/163 |
| 2008/0130164 A1 | 6/2008 | Kobayashi | | |

FOREIGN PATENT DOCUMENTS

| | | |
|---|---|---|
| JP | 6-19638 A | 1/1994 |
| JP | 06-019638 A | 1/1994 |
| JP | 07-105660 A | 4/1995 |
| JP | 11-297003 A | 10/1999 |
| JP | 2002-100152 A | 4/2002 |
| JP | 2004-038380 A | 2/2004 |
| JP | 2004-158157 A | 6/2004 |
| WO | WO-2006/131974 | 12/2006 |

OTHER PUBLICATIONS

"Japanese Office Action" mailed by JPO and corresponding to Japanese application No. 2009-151526 on Jun. 7, 2011, with English translation.
Japanese Office Action dated Aug. 23, 2011 for corresponding Japanese Application No. 2009-151526, with Partial English-language Translation.

* cited by examiner

*Primary Examiner* — Andrew L Sniezek
(74) *Attorney, Agent, or Firm* — Fujitsu Patent Center

(57) ABSTRACT

A tape library system includes a plurality of cartridge cells for accommodating a plurality of tape cartridges respectively, a tape drive for writing and reading data to and from the tape cartridge inserted therein, a diagnosis drive for diagnosing the tape cartridge inserted therein, an cartridge carriage mechanism for inserting and ejecting the tape cartridge into and from the tape drive and the diagnosis drive, and a diagnosis controller for controlling the cartridge carriage mechanism to load the tape cartridge into the diagnosis drive and for controlling the diagnosis drive to diagnose the tape cartridge inserted therein.

8 Claims, 15 Drawing Sheets

| INDIVIDUAL NUMBER | STATUS |
|---|---|
| AAA123 | DURING DIAGNOSIS |

| INDIVIDUAL NUMBER | STATUS |
|---|---|
| AAA123 | DURING DIAGNOSIS |
| BBB123 | WAITING DIAGNOSIS |
| CCC123 | WAITING DIAGNOSIS |

TAPE LIBRARY SYSTEM AND METHOD OF DIAGNOSING TAPE CARTRIDGES

CROSS-REFERENCE TO RELATED APPLICATION

This application is based upon and claims the benefit of priority of the prior Japanese Patent Application No. 2009-151526, filed on Jun. 25, 2009, the entire contents of which are incorporated herein by reference.

FIELD

The embodiments discussed herein are related to a tape library system.

BACKGROUND

A technique has been proposed, which relates to a magnetic tape storage apparatus that inserts a magnetic tape cartridge having a magnetic tape medium, into a magnetic tape device, and writes data from a host, onto the magnetic tape medium, or transmits data read from the magnetic tape medium, to the host. For example, Japanese Laid-open Patent Publication No. 2004-158157 discloses a tape library apparatus.

FIG. 14 illustrates a configuration of an existing virtual tape system 600. The virtual tape system 600 includes a global server 610 that is a host, a virtual tape apparatus 620, and a physical tape library apparatus 630.

The global server 610 includes a task execution unit 611 and a virtual tape control unit 612. The virtual tape apparatus 620 includes first and second control servers 621 and 622 that perform host interface control, tape library control, and volume management of a virtual tape, a tape volume cache (TVC) 623, and a physical library control server 624 that controls the physical tape library apparatus 630. The physical tape library apparatus 630 includes, for example, magnetic tape devices 631 and 632 into each of which one of magnetic tape cartridges 700a to 700d is inserted. When receiving writing of data A from a task job executed by the task execution unit 611 of the global server 610, the virtual tape apparatus 620 stores the data A onto the tape volume cache 623. After completion of the task job, the virtual tape apparatus 620 stores (migrates) the data A in the tape volume cache 623, onto a magnetic tape cartridge 700a in the physical library apparatus 630.

Moreover, when receiving reading of data B from a task job executed by the task execution unit 611 of the global server 610, the virtual tape apparatus 620 confirms whether or not there is the data B on the tape volume cache 623 (whether or not it is on-cache). When there is the data B on the tape volume cache 623, the virtual tape apparatus 620 transfers the data B from the tape volume cache 623 to the global server 610. On the other hand, when there is not the data B on the tape volume cache (it is off-cache), the virtual tape apparatus 620 recalls the data B stored on the magnetic tape cartridge 700b in the physical tape library apparatus 630, onto the tape volume cache 623. Then, the virtual tape apparatus 620 transfers the data B from the tape volume cache 623 to the global server 610.

As described above, main processes of the virtual tape apparatus 620 of the virtual tape system 600 are to store and recall data between the tape volume cache 623 and the magnetic tape cartridges 700 in the physical tape library apparatus 630, according to access from the global server 610. Thus, full attention needs to be given to a state (normal or abnormal state) of the magnetic tape cartridge 700.

However, at present, the state (normal or abnormal state) of the magnetic tape cartridge 700 can be determined only after the magnetic tape cartridge 700 is inserted into the magnetic tape device. Thus, the following problem arises.

FIG. 15 is an external view of the magnetic tape cartridge 700 and

FIG. 16 is a configuration diagram of the magnetic tape cartridge 700. In the magnetic tape cartridge 700, a magnetic tape medium 705 is wound therein. For example, it is assumed that the magnetic tape cartridge 700 inserted into the magnetic tape device is abnormal at a reel part 710 having flanges and magnetic seals or a leader block 710 owing to a physical damage. In this case, the magnetic tape cartridge 700 cannot be ejected from the magnetic tape device. Thus, the magnetic tape device is blocked, and cannot be used even when being not abnormal.

SUMMARY

According to an aspect of the invention, a tape library system includes a plurality of cartridge cells for accommodating a plurality of tape cartridges respectively, a tape drive for writing and reading data to and from the tape cartridge inserted therein, a diagnosis drive for diagnosing the tape cartridge inserted therein, an cartridge carriage mechanism for inserting and ejecting the tape cartridge into and from the tape drive and the diagnosis drive, and a diagnosis controller for controlling the cartridge carriage mechanism to load the tape cartridge into the diagnosis drive and for controlling the diagnosis drive to diagnose the tape cartridge inserted therein.

According to another aspect of the invention, a method of diagnosing a tape cartridge accommodated in a tape library system, includes inserting the tape cartridge into a diagnosis drive for diagnosing the tape cartridge, diagnosing the tape cartridge inserted into the diagnosis drive, inserting the diagnosed tape cartridge into a tape drive for writing and reading data to and from the tape cartridge after the diagnosing, and writing and reading data to and from the tape cartridge inserted into the tape drive.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a configuration of a status management table according to an embodiment 4;

DESCRIPTION OF EMBODIMENTS

Preferred embodiments of the present invention will be explained with reference to accompanying drawings.

With reference to the accompanying drawings, the following will describe in detail embodiments of a tape library system, a tape cartridge diagnosis method, and a tape cartridge diagnosis program, which are disclosed in the application. Note that the technique disclosed in the application should not be limited to embodiments described below as the embodiments of the tape library system, the tape cartridge diagnosis method, and the tape cartridge diagnosis program.

Embodiment 1

Figure 1:
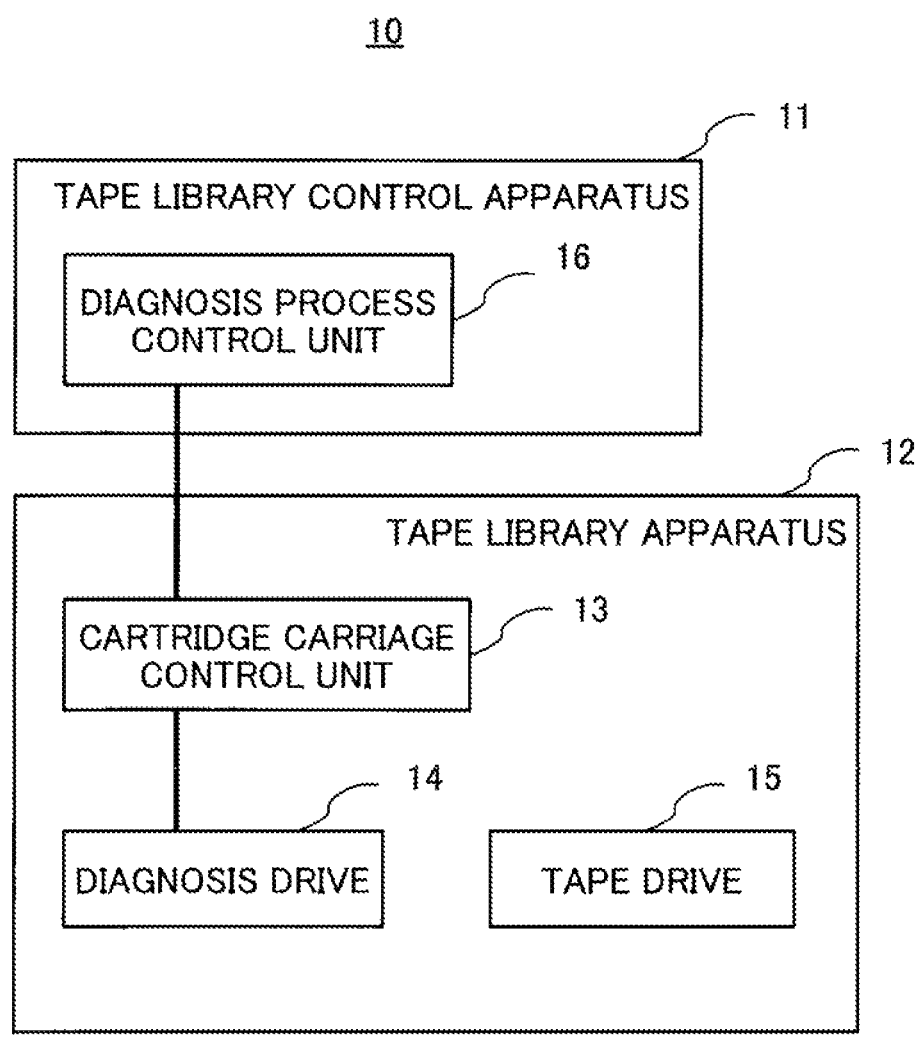
FIG. 1 illustrates a schematic configuration of a tape library system according to an embodiment 1.

FIG. 1 illustrates a schematic configuration of a tape library system 10 according to an embodiment 1. The tape library system 10 includes a tape library apparatus 11 and a tape library control apparatus 12.

The tape library apparatus 11 includes a cartridge carriage control unit 13 that performs insertion of a magnetic tape cartridge into a magnetic tape device 14 and ejection of the magnetic tape cartridge from the magnetic tape device 14 and a diagnostic magnetic tape device 15 that is not used for an actual operation.

The tape library control apparatus 12 includes a diagnosis process control unit 16 that controls the control unit of the tape library apparatus 11, that inserts the magnetic tape cartridge into the diagnostic magnetic tape device 15, and that causes the diagnostic magnetic tape device 15 to perform a diagnostic operation on the magnetic tape cartridge.

According to such a configuration, an abnormality of the magnetic tape cartridge that is attributed to a physical damage, can be detected before the magnetic tape cartridge is actually used.

Embodiment 2

Figure 2:
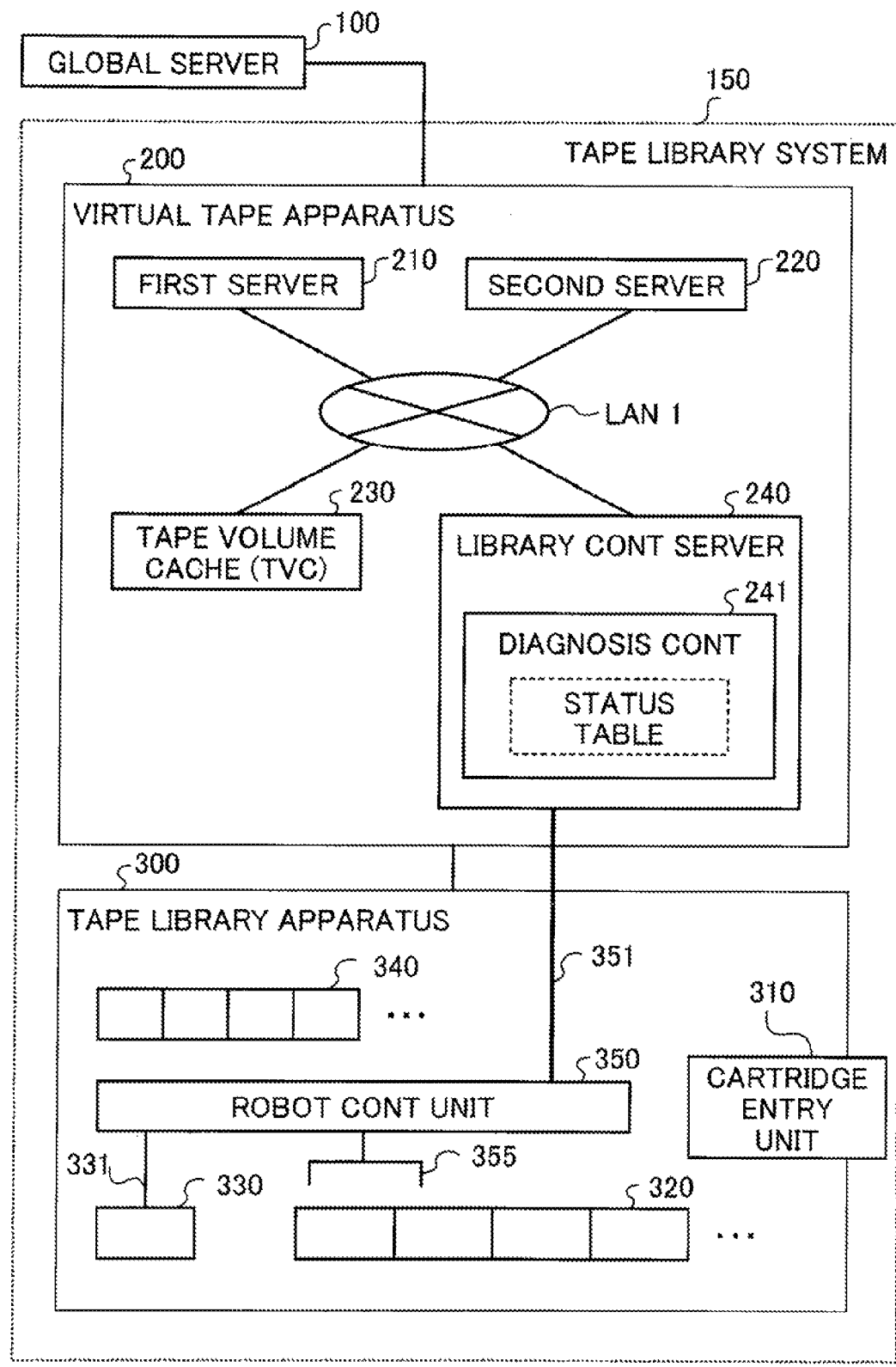
FIG. 2 illustrates a configuration of a tape library system according to an example 2.

FIG. 2 illustrates a configuration of a tape library system 150 according to an embodiment 2. The tape library system 150 is communicably connected to a global server 100 that serves as a host computer, and includes a virtual tape apparatus 200 and a tape library apparatus 300.

Referring to FIG. 2, the tape library apparatus 300 includes a cartridge entry unit 310, a plurality of tape drives 320, a diagnosis drive 330, a plurality of cells 340, and a robot control module unit 350. The robot control module unit 350 has a robot hand 355 as a cartridge carriage mechanism. The diagnosis drive 330 is connected to the robot control module unit 350 through an internal command path 331.

The cartridge entry unit 310 is referred to as a cartridge access station (CAS) or a magazine, and entered a tape cartridge from the outside into the tape library apparatus 300.

Each tape drive 320 is referred to as a magnetic tape device, receives insertion of a tape cartridge, and performs reading or writing of data in an actual operation of the tape library system.

The diagnosis drive 330 is a drive for abnormality diagnosis, which is not used for the actual operation of the tape library system and is simplified for only a diagnosis operation. When performing diagnosis as to whether or not a tape cartridge entered from the outside via the cartridge entry unit 310 is abnormal, the diagnosis drive 330 receives insertion of the tape cartridge by the robot control module unit 350. For example, an abnormality of the tape cartridge is an abnormality attributed to a physical damage of a leader block 710, a reel 720, or the like, of the tape cartridge, and a situation is expected in which the tape cartridge cannot be ejected.

Then, when receiving a performance command of abnormality diagnosis from a library control server 240 via the robot control module unit 350, the diagnosis drive 330 performs a diagnostic operation that includes loading and unloading of a tape cartridge, according to the performance command. The loading is an operation of winding the magnetic tape from the tape cartridge to a predetermined reading position relative to a head provided in the diagnosis drive 330. The unloading is an operation of winding the magnetic tape, wound from the tape cartridge, back to the tape cartridge, and ejecting the tape cartridge from the diagnosis drive 330.

When the diagnostic operation is successfully completed to the unloading, the diagnosis drive 330 notifies the library control server 240, via the robot control module unit 350, of the completion of the diagnostic operation. When the diagnostic operation is not successfully completed to the unloading, the diagnosis drive 330 does not notify the library control server 240 of the completion of the diagnostic operation.

Into each cell 340, a tape cartridge entered from the outside via the cartridge entry unit 310, is stored. When the tape cartridge is inserted from the cell 340 to the tape drive 320, an operation of the tape cartridge is started.

The robot control module unit 350 controls an operation of a robot that performs insertion of the tape cartridge entered from the outside, into the diagnosis drive 330, storing the tape cartridge from the diagnosis drive 330 into the cell 340, and the like.

Specifically, when detecting an entry of a tape cartridge from the outside, the robot control module unit 350 obtains an individual number (an identification number of the tape cartridge) assigned uniquely to the tape cartridge. Then, the robot control module unit 350 notifies the library control server 240 of the detection of the entry of the tape cartridge, along with the individual number obtained from the tape cartridge.

When receiving, from the library control server 240, a command to insert the tape cartridge into the diagnosis drive 330, the robot control module unit 350 controls the operation of the robot to insert the tape cartridge entered from the outside, into the diagnosis drive 330. When the insertion is completed, the robot control module unit 350 notifies the library control server 240 of the completion of the insertion of the tape cartridge into the diagnosis drive 330.

When receiving, from the library control server 240, a command to store the tape cartridge inserted into the diagnosis drive 330, into the cell 340, the robot control module unit 350 controls the operation of the robot to store the tape cartridge in the diagnosis drive 330, into the cell 340. When the storing is completed, the robot control module unit 350 notifies the library control server 240 of the completion of the storing of the tape cartridge into the cell 340.

The virtual tape apparatus 200 performs control of an interface with the global server 100, control of a tape library of the tape library apparatus 300, and management of a virtual tape volume. As depicted in FIG. 2, the virtual tape apparatus 200 includes a first control server 210, a second control server 220, a tape volume cache 230, and a library control server 240. The first control server 210, the second control server 220, the tape volume cache 230, and the library control server 240 are communicably connected to each other via an internally established LAN 1.

Each of the first control server 210 and the second control server 220 performs reading or writing of data according to a command from the global server 100. When receiving, from the global server 100, reading of data, the first control server 210 determines whether or not data to be read is present on the tape volume cache 230 (whether or not it is on-cache). When the data to be read is present on the tape volume cache 230 (it is on-cache), the first control server 210 transfers the data to be read, from the tape volume cache 230 to the global server 100.

On the other hand, when the data to be read is not present on the tape volume cache 230 (it is off-cache), the first control server 210 obtains the data to be read, from among data stored in the tape library apparatus 300 (data in the tape cartridge inserted into the tape drive 320), and recalls the data onto the tape volume cache 230. Then, the first control server 210 transfers the data to be read, from the tape volume cache 230 to the global server 100. Note that the second control server 220 serves as a stand-by system for the first control server 210.

The tape volume cache 230 stores the data written from the first control server 210 or the data read from the tape library apparatus 300 according to the command from the global server 100.

The library control server 240 sends, to the robot control module unit 350 provided in the tape library apparatus 300 through a robot control path 351, a command to perform insertion or ejection of the tape cartridge from or into the cell 340. In addition, as depicted in FIG. 2, the library control server 240 includes a diagnosis process control unit 241 that causes the diagnosis drive 330 to perform abnormality diagnosis of the tape cartridge.

Figures 3, 4:
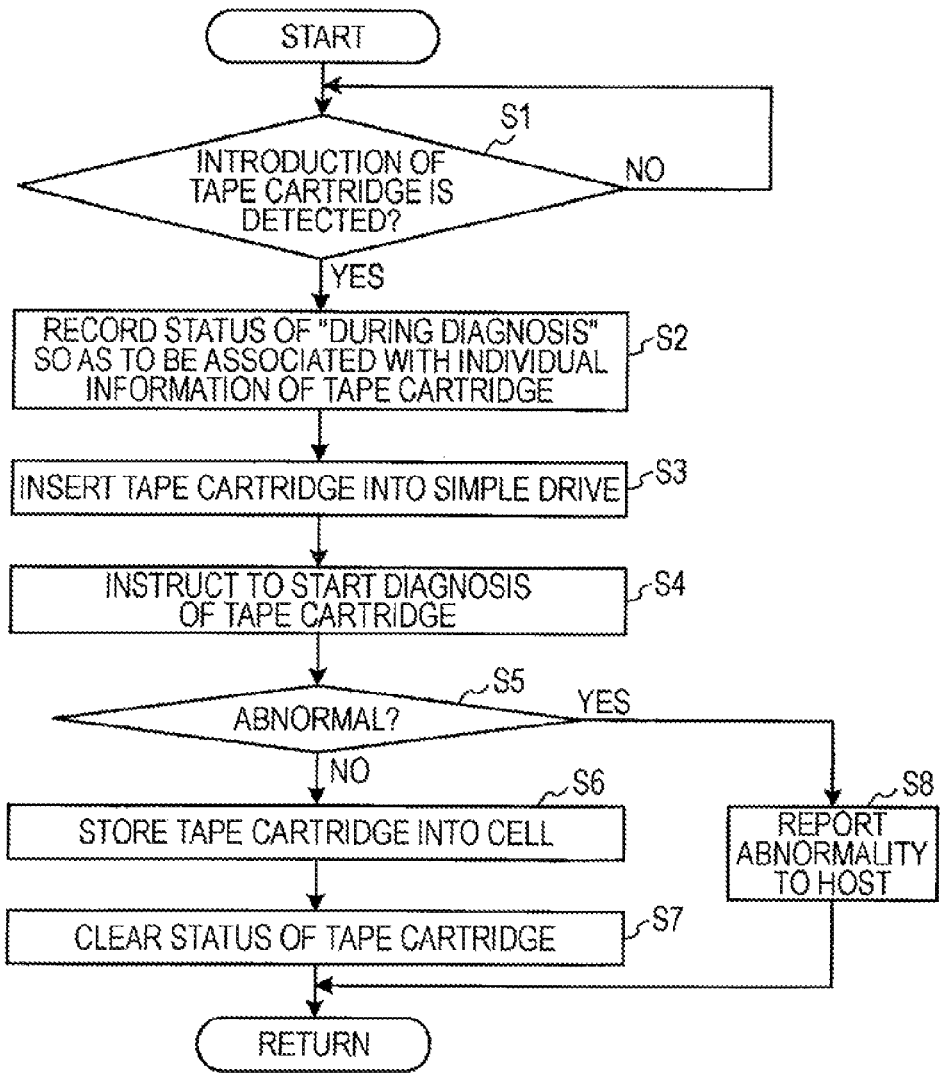
FIG. 3 illustrates an example of a configuration of a status management table according to the embodiment 2.
FIG. 4 illustrates a flow of processing performed by a virtual tape apparatus according to the embodiment 2.

When receiving, from the robot control module unit 350, detection of the entry of the tape cartridge, the diagnosis process control unit 241 records a status of the tape cartridge as "during diagnosis". Specifically, as depicted in FIG. 3, the diagnosis process control unit 241 records the status "during diagnosis" in an internally-provided status management table 242, such that the status is associated with an individual number "AAA123" of the tape cartridge that is received from the robot control module unit 350. FIG. 3 illustrates an example of a configuration of the status management table 242 according to the embodiment 2.

Then, the diagnosis process control unit 241 sends, to the robot control module unit 350, a command to insert the tape cartridge, of which the entry is detected, into the diagnosis drive 330. When receiving, from the robot control module unit 350, completion of the insertion of the tape cartridge into the diagnosis drive 330, the diagnosis process control unit 241 sends a performance command of abnormality diagnosis to the diagnosis drive 330.

Here, the diagnosis process control unit 241 selectively uses two types of commands, a load full diagnosis command and a load time designation command, as performance commands to be sent to the diagnosis drive 330. The load full diagnosis command is a command to perform loading the magnetic tape medium in the tape cartridge to the end and then unloading. The load time designation command is a command to perform loading the magnetic tape medium in the tape cartridge by a designated time and then unloading.

For example, when a processing load of the tape library apparatus 300 is low, the diagnosis process control unit 241 sends the load full diagnosis command, causing a detailed diagnostic operation to be performed on the tape cartridge. On the other hand, when the processing load of the tape library apparatus 300 is high, the diagnosis process control unit 241 sends the load time designation command, causing a diagnostic operation to be performed on the tape cartridge in a possible range while taking into consideration the processing load of the tape library apparatus 300.

Moreover, the diagnosis process control unit 241 also can selectively use the load full diagnosis command and the load time designation command depending on the number of tape cartridges entered from the outside. For example, when a tape cartridge is entered from the outside and the number of tape cartridges to be diagnosed is one, the diagnosis process control unit 241 sends the load full diagnosis command, causing a diagnostic operation to be performed on the tape cartridge. When a plurality of tape cartridges are entered from the outside and the number of tape cartridges to be diagnosed is a plural number, the diagnosis process control unit 241 sends the load time designation command, causing a diagnostic operation to be performed on the tape cartridges.

Then, when receiving, from the diagnosis drive 330, a notice of completion of the diagnosis, the diagnosis process control unit 241 determines that the tape cartridge is not abnormal, and sends, to the robot control module unit 350, a command to store the tape cartridge in the diagnosis drive 330, into the cell 340. When receiving completion of the storing of the tape cartridge into the cell 340, the diagnosis process control unit 241 refers to the status management table 242 and clears the status of the tape cartridge stored into the cell 340 (e.g., empties the field of the status).

On the other hand, for example, when there is no notice of completion of diagnosis from the diagnosis drive 330 within a predetermined time period, the diagnosis process control unit 241 diagnoses the tape cartridge as being abnormal. Then, the diagnosis process control unit 241 notifies the global server 100 of the abnormality of the tape cartridge together along with the individual number of the tape cartridge.

FIG. 4 illustrates a flow of processing performed by the virtual tape apparatus 200 according to the embodiment 2. The diagnosis process control unit 241 waits for detection of an entry of a tape cartridge by the robot control module unit 350 (S1). When an entry of a tape cartridge is not detected by the robot control module unit 350 (No at S1), the diagnosis process control unit 241 continues to wait for detection of an entry of a tape cartridge.

Then, when receiving, from the robot control module unit 350, detection of an entry of a tape cartridge (Yes at S1), the diagnosis process control unit 241 records the status of the tape cartridge as "during diagnosis" (S2).

After recording the status of the tape cartridge as "during diagnosis", the diagnosis process control unit 241 sends, to the robot control module unit 350, a command to insert the tape cartridge, of which the entry is detected, into the diagnosis drive 330 (S3). Then, when receiving, from the robot control module unit 350, completion of the insertion of the tape cartridge into the diagnosis drive 330, the diagnosis process control unit 241 sends a performance command of abnormality diagnosis to the diagnosis drive 330 to instruct the diagnosis drive 330 to start diagnosis of the tape cartridge (S4).

Subsequently, on the basis of receipt of a response from the diagnosis drive 330, the diagnosis process control unit 241 diagnoses whether or not the tape cartridge is abnormal (S5). In other words, when receiving a notice of completion of the diagnosis from the diagnosis drive 330, the diagnosis process control unit 241 diagnoses the tape cartridge as not being abnormal (No at S5), and sends, to the robot control module unit 350, a command to store the tape cartridge in the diagnosis drive 330, into the cell 340 (S6). Then, the diagnosis process control unit 241 refers to the status management table 242 and clears the status of the tape cartridge stored into the cell 340 (S7), and returns to the above S1.

On the other hand, when there is no notice of completion of the diagnosis from the diagnosis drive 330 within a predetermined time period, the diagnosis process control unit 241 diagnoses the tape cartridge as being abnormal (Yes at S5), and reports the abnormality of the tape cartridge along with the individual number of the tape cartridge to the global server 100 (S8). Then, the diagnosis process control unit 241 returns to the above S1.

Figure 5:
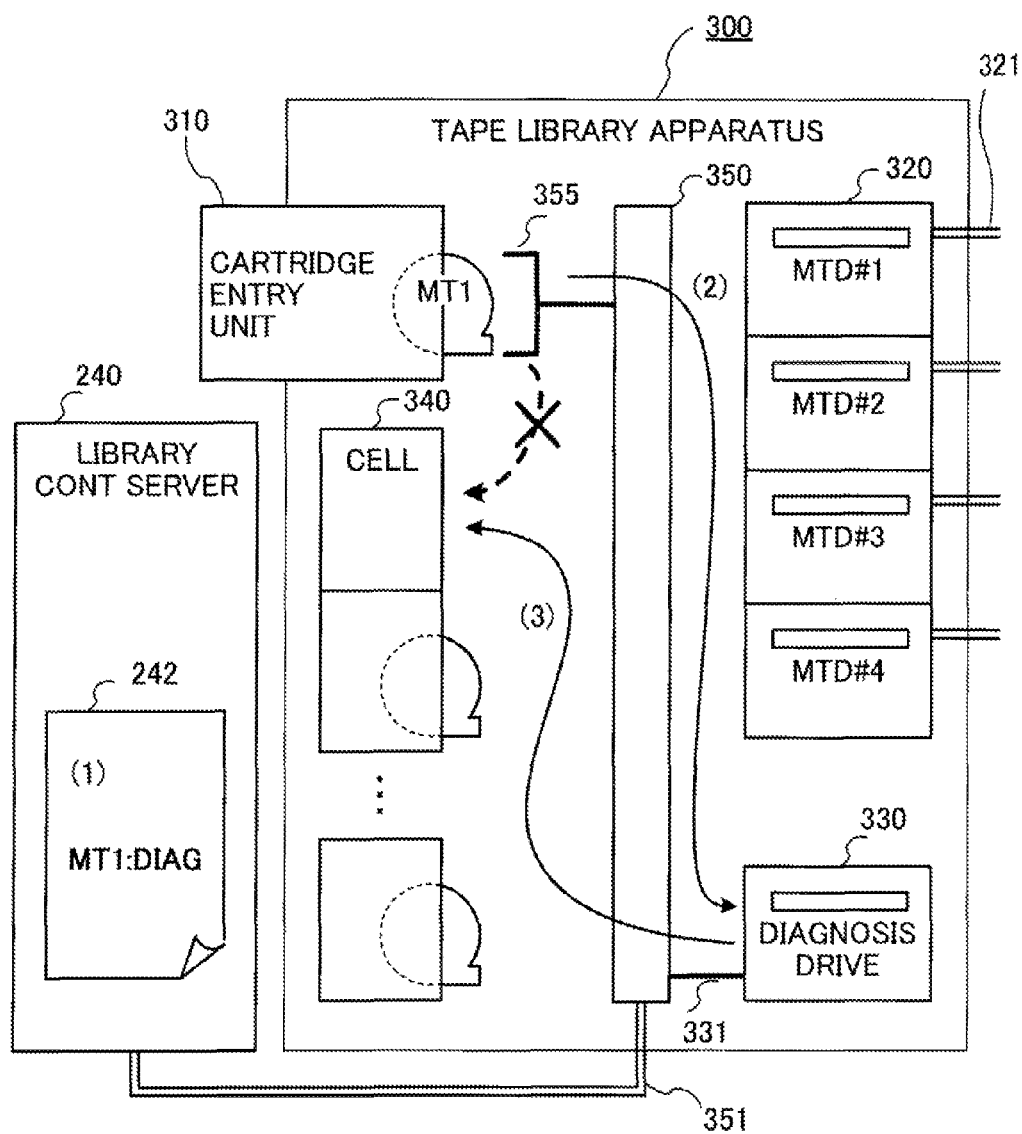
FIG. 5 illustrates an effect achieved by the embodiment 2.

FIG. 5 illustrates an effect achieved by the embodiment 2. As described above, according to the embodiment 2, using, as a trigger, a timing when a tape cartridge MT1 is entered from the outside through the cartridge entry unit 310, a status management table 242 in the library control server 240 is updated such that the tape cartridge MT1 is recorded as the status "during diagnosis" (see (1) in FIG. 5).

Next, the tape cartridge MT1 is inserted into a diagnosis drive 330 (see (2) in FIG. 5), and it is diagnosed whether or not the tape cartridge MT1 is abnormal. Where the tape cartridge MT1 is not abnormal, the tape cartridge MT1 is stored into a cell 340 (see (3) in FIG. 5) to be ready for an actual operation (reading or writing) at the tape drive 320. Each tape drive 320 is connected to the first and second control servers 210 and 220 through data paths 321.

In other words, without actually inserting the tape cartridge into the tape drive 320, an abnormality of the tape cartridge can be detected before the tape cartridge entered from the outside is used for an actual operation (before being inserted into the tape drive 320 for reading or writing). Thus, the tape drive that is not abnormal is prevented from being blocked owing to an abnormality of the tape cartridge.

Embodiment 3

In the above embodiment 2, using, as a trigger, a timing when a tape cartridge is entered from the outside, it is diagnosed whether or not the tape cartridge is abnormal. However, the embodiment is not limited thereto, and, at a timing when a tape cartridge on which reading or writing is performed is ejected from the tape drive 320, it may be diagnosed whether or not the ejected tape cartridge is abnormal.

A configuration of a tape library system according to the embodiment 3 differs from that of the embodiment 2 in the following points.

Specifically, the robot control module unit 350 notifies the library control server 240 of completion of an ejection of the tape cartridge from the tape drive 320.

The diagnosis process control unit 241 detects the ejection of the tape cartridge by receiving the notice of completion of the ejection of the tape cartridge from the robot control module unit 350, and records the status of the tape cartridge as "during diagnosis".

Figure 6:
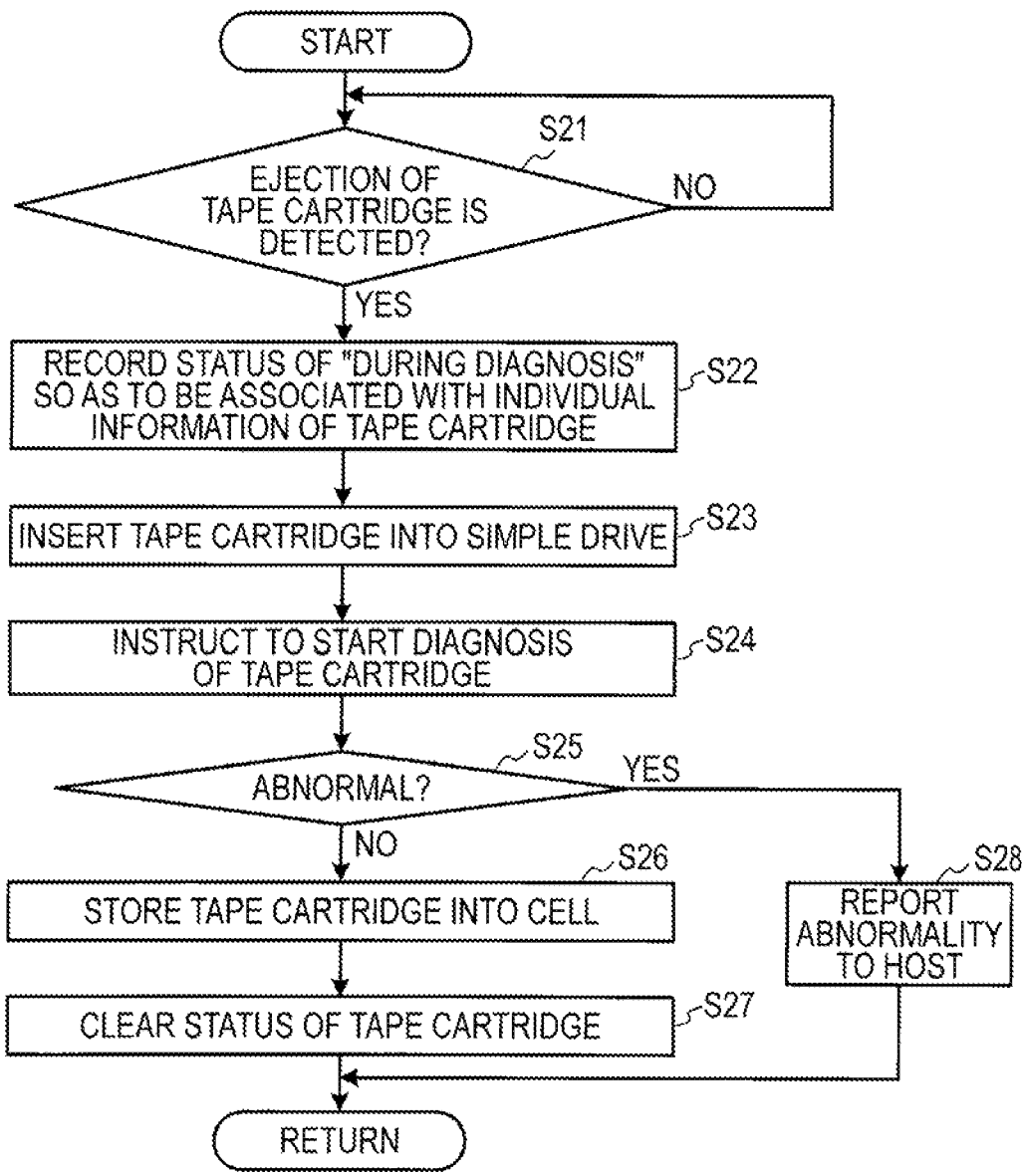
FIG. 6 illustrates a flow of processing performed by a virtual tape apparatus according to an embodiment 3.

FIG. 6 illustrates a flow of processing performed by a virtual tape apparatus according to an embodiment 3. The diagnosis process control unit 241 detects an ejection of a tape cartridge on the basis of receipt of a notice of completion of the ejection of the tape cartridge by the robot control module unit 350 (S21). When not having detected an ejection of a tape cartridge (No at S21), the diagnosis process control unit 241 continues detection of an ejection of a tape cartridge.

Then, the diagnosis process control unit 241 detects an ejection of a tape cartridge by receiving a notice of completion of the ejection of the tape cartridge from the robot control module unit 350 (Yes at S21), and records the state of the tape cartridge as "during diagnosis" (S22). The subsequent steps S23 to S28 are the same as those in the above embodiment 2 (steps S3 to S8 in FIG. 4).

Figure 7:
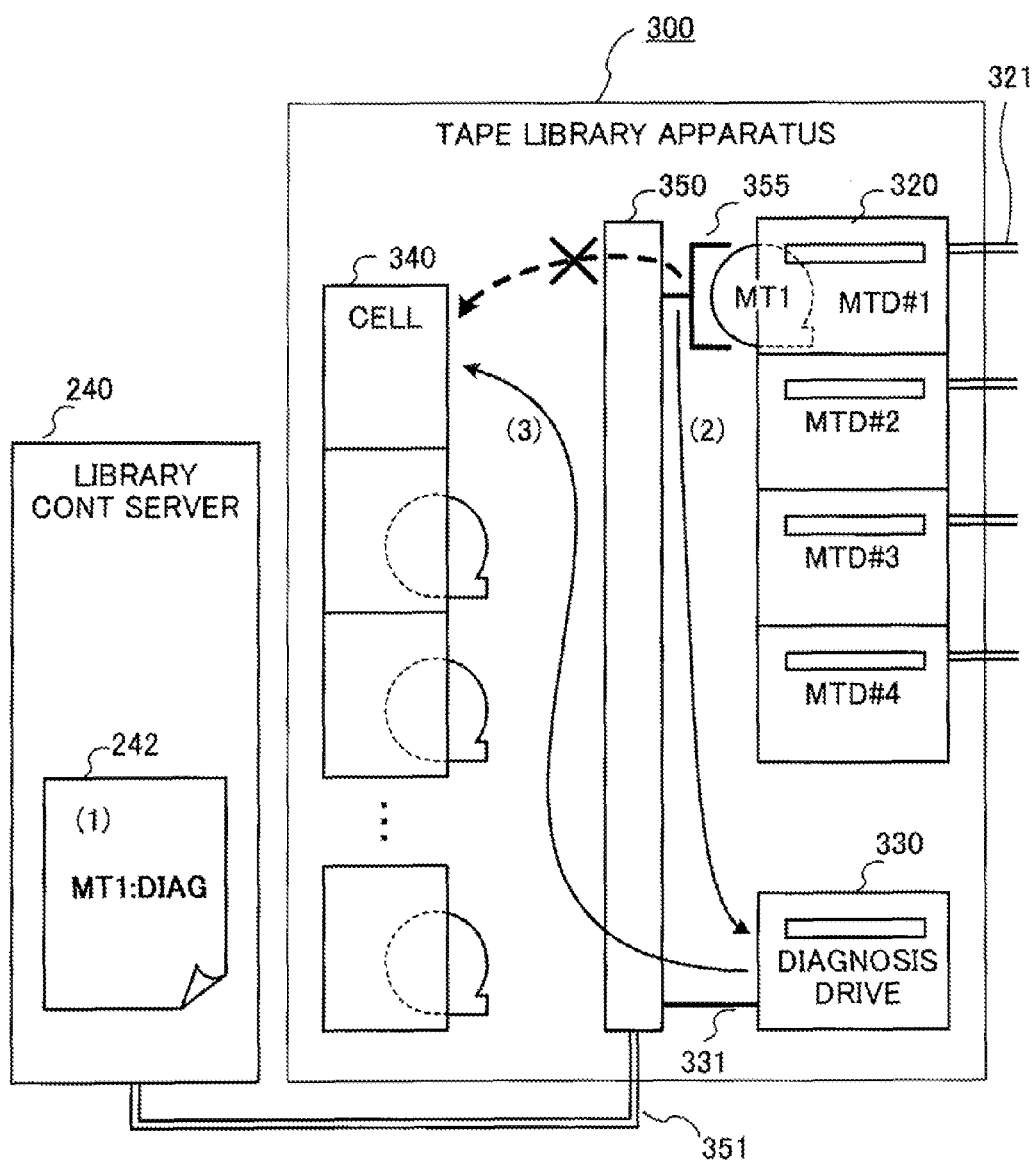
FIG. 7 illustrates an effect achieved by the embodiment 3.

FIG. 7 illustrates an effect achieved by the embodiment 3. As described above, according to the embodiment 3, using, as a trigger, a timing when a tape cartridge MT1 is ejected from the tape drive 320, a status management table 242 is updated such that the tape cartridge MT1 is recorded as "during diagnosis" (see (1) in FIG. 7).

Next, the tape cartridge MT1 is inserted into a diagnosis drive 330 (see (2) in FIG. 7), and it is diagnosed whether or not the tape cartridge MT1 is abnormal. When the tape cartridge MT1 is not abnormal, the tape cartridge MT1 is stored into a cell 340 (see (3) in FIG. 7) to be ready for an actual operation (reading or writing) at the tape drive 320 again.

In other words, an abnormality of the tape cartridge can be detected before the tape cartridge is used next time. Thus, the drive that is not abnormal is prevented from being blocked owing to an abnormality of the tape cartridge.

Embodiment 4

The above embodiment 1 has described the operation of the tape cartridge system when one tape cartridge is entered from the outside, but the present embodiment is not limited thereto. The following embodiment 4 will describe an operation of a tape cartridge system when a plurality of tape cartridges are entered from the outside.

A configuration of the tape library system according to the embodiment 4 differs from that of the embodiment 1 in the following points.

Specifically, when detecting entries of a plurality of tape cartridges from the outside, the robot control module unit 350 obtains an individual number assigned uniquely to each tape cartridge. Then, the robot control module unit 350 notifies the library control server 240 of detection of the entries of the plurality of tape cartridges along with the individual numbers of the tape cartridges that are arranged such that the order of entry is recognized.

When receiving, from the robot control module unit 350, the detection of the entries of the plurality of tape cartridges, the diagnosis process control unit 241 records the status of the tape cartridge that is first entered in the tape library apparatus 300, as "during diagnosis". In addition, the diagnosis process control unit 241 records the status of each of the following tape cartridges that are entered in the tape library apparatus 300 after the first tape cartridge, as "waiting for diagnosis".

FIG. 8 illustrates a configuration of a status management table 242 according to the embodiment 4. The diagnosis process control unit 241 records the status "during diagnosis" in the status management table 242 such that the status is associated with an individual number "AAA123" of the tape cartridge that is received from the robot control module unit 350. In addition, the diagnosis process control unit 241 records the statuses "waiting for diagnosis" such that the statuses are associated with individual numbers "BBB123" and "CCC123" of the tape cartridges, respectively.

Then, the diagnosis process control unit 241 inserts the tape cartridge whose status is recorded as "during diagnosis", into the diagnosis drive 330, and sends, to the robot control module unit 350, a command to temporarily store the other tape cartridges whose statuses are recorded as "waiting for diagnosis", into the cells 340. When receiving, from the robot control module unit 350, completion of the insertion of the tape cartridge into the diagnosis drive 330, the diagnosis process control unit 241 sends a performance command of abnormality diagnosis to the diagnosis drive 330.

Then, when receiving completion of the diagnosis from the diagnosis drive 330, the diagnosis process control unit 241 diagnoses the tape cartridge that is first entered, as not being abnormal, and sends, to the robot control module unit 350, a command to store the tape cartridge in the diagnosis drive 330, into the cell 340. When receiving completion of the storing of the tape cartridge into the cell 340, the diagnosis process control unit 241 refers to the status management table 242 and clears the status of the tape cartridge stored into the cell 340.

On the other hand, for example, when there is no notice of completion of the diagnosis from the diagnosis drive 330 within a predetermined time period, the diagnosis process control unit 241 diagnoses the first tape cartridge as being abnormal. Then, the diagnosis process control unit 241 reports the abnormality of the tape cartridge along with the individual number of the tape cartridge to the global server 100.

After clearing the status, or after reporting the abnormality, the diagnosis process control unit 241 refers to the status management table 242 and determines whether or not there is any tape cartridge whose status is "waiting for diagnosis". As a result of the determination, when there is any tape cartridge whose status is "waiting for diagnosis", the diagnosis process control unit 241 sends, to the robot control module unit 350, a command to insert the next tape cartridge whose status is "waiting for diagnosis", from the cell 340 into the diagnosis drive 330.

Then, when receiving, from the robot control module unit 350, completion of the insertion of the tape cartridge into the diagnosis drive 330, the diagnosis process control unit 241 sends a performance command of abnormality diagnosis to the diagnosis drive 330. Thereafter, the same operation is repeated until no tape cartridge whose status is "waiting for diagnosis" exists.

Figure 9:
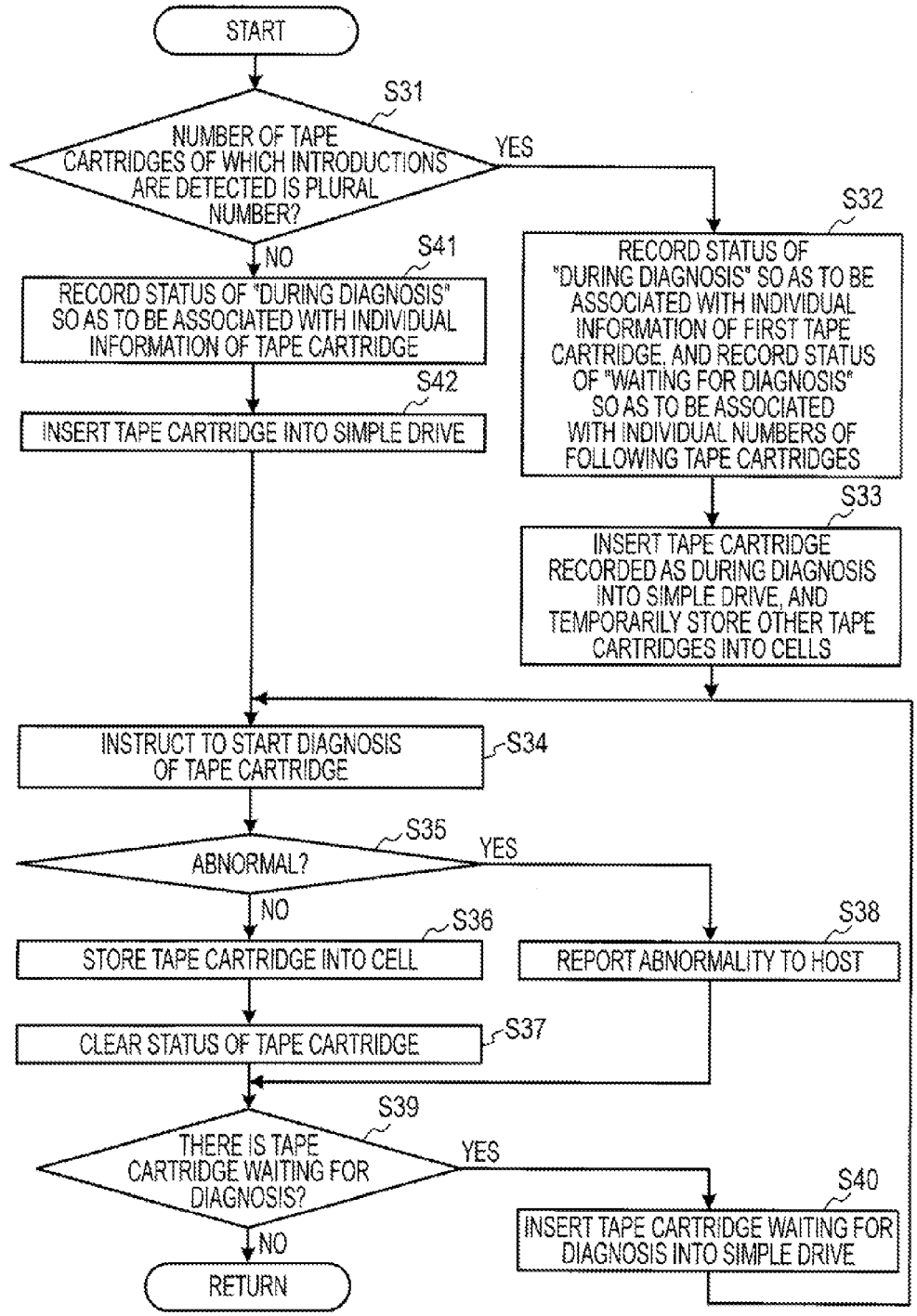
FIG. 9 illustrates a flow of processing performed by a virtual tape apparatus according to the embodiment 4.

FIG. 9 illustrates a flow of processing performed by a virtual tape apparatus according to the embodiment 4. The diagnosis process control unit 241 determines whether or not the number of tape cartridges of which entries are detected by the robot control module unit 350, is a plural number (S31).

When the diagnosis process control unit 241 receives detection of entries of a plurality of tape cartridges from the robot control module unit 350 and the number of tape cartridges of which entries are detected is a plural number (Yes at S31), the diagnosis process control unit 241 operates as follows. Specifically, the diagnosis process control unit 241 records the status of the tape cartridge that is first entered into the tape library apparatus 300, as "during diagnosis", and records the status of each of the following tape cartridges that are entered into the tape library apparatus 300 after the first tape cartridge, as "waiting for diagnosis" (S32).

Then, the diagnosis process control unit 241 sends, to the robot control module unit 350, a command: to insert the tape cartridge whose status is recorded as "during diagnosis", into the diagnosis drive 330; and to temporarily store the other tape cartridges whose statuses are recorded as "waiting for diagnosis", into the cells 340 (S33).

When receiving, from the robot control module unit 350, completion of the insertion of the tape cartridge into the diagnosis drive 330, the diagnosis process control unit 241 instructs the diagnosis drive 330 to start diagnosis of the tape cartridge by sending a performance command of abnormality diagnosis to the diagnosis drive 330 (S34).

Then, on the basis of receipt of a response from the diagnosis drive 330, the diagnosis process control unit 241 diagnoses whether or not the tape cartridge is abnormal (S35). In other words, when receiving completion of the diagnosis from the diagnosis drive 330, the diagnosis process control unit 241 diagnoses the first entered tape cartridge as not being abnormal (No at S35), and sends, to the robot control module unit 350, a command to store the tape cartridge in the diagnosis drive 330, into the cell 340 (S36). Then, the diagnosis process control unit 241 refers to the status management table 242 and clears the status of the tape cartridge stored into the cell 340 (S37).

On the other hand, for example, when there is no notice of completion of the diagnosis from the diagnosis drive 330 within a predetermined time period, the diagnosis process control unit 241 diagnoses the first entered tape cartridge as being abnormal (Yes at S35), and reports the abnormality of the tape cartridge along with the individual number of the tape cartridge to the global server 100 (S38).

After clearing the status (S37), or after reporting the abnormality (S38), the diagnosis process control unit 241 refers to the status management table 242 and determines whether or not there is any tape cartridge whose status is "waiting for diagnosis" (S39). As a result of the determination, when there is any tape cartridge whose status is "waiting for diagnosis" (Yes at S39), the diagnosis process control unit 241 sends, to the robot control module unit 350, a command to insert the next tape cartridge whose status is "waiting for diagnosis", from the cells 340 into the diagnosis drive 330 (S40). Then, the diagnosis process control unit 241 repeats the above operations at steps S34 to S40 until no tape cartridge whose status is "waiting for diagnosis" exists.

Here, turning back to the description of S31, when the number of tape cartridges of which entries are detected is one (No at S31), the diagnosis process control unit 241 operates in a similar manner as in the above embodiment 1 (steps S2 to S8 in FIG. 4).

Figure 10:
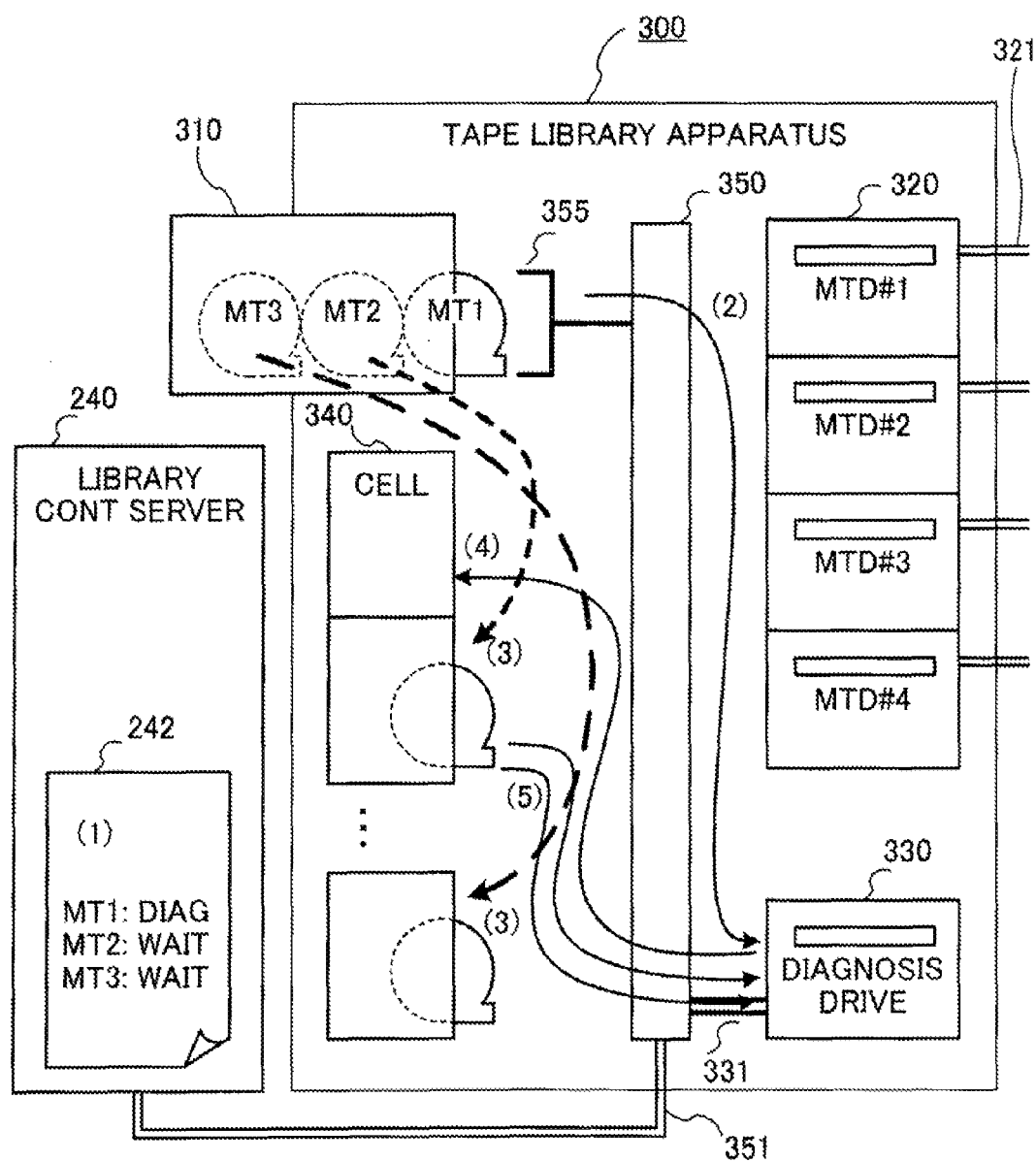
FIG. 10 illustrates an effect achieved by the embodiment 4.

FIG. 10 illustrates an effect achieved by the embodiment 4. As described above, in the embodiment 4, when tape cartridges MT1, MT2, and MT3 are entered from the outside, a status management table 242 is updated such that the tape cartridge MT1 is recorded as "during diagnosis" and the tape cartridges MT2 and MT3 are recorded as "waiting for diagnosis" (see (1) in FIG. 10).

Next, the tape cartridge MT1 that is first entered is inserted into a diagnosis drive 330 (see (2) in FIG. 10), and the following tape cartridges MT2 and MT3 are temporarily stored into cells 340 (see (3) in FIG. 10). Then, diagnosis is performed as to whether or not the tape cartridge MT1 is abnormal.

When the tape cartridge MT1 is not abnormal, the tape cartridge MT1 is stored into a cell 340 (see (4) in FIG. 10) to be ready for an actual operation (reading or writing) at the tape drive 320. Subsequently, the tape cartridge MT2 is inserted into the diagnosis drive 330 (see (5) in FIG. 10), and diagnosis is performed as to whether or not the tape cartridge MT2 is abnormal. The same operation is repeated until diagnosis of the tape cartridge MT3 is completed.

As described above, according to the embodiment 4, even when a plurality of tape cartridges are entered from the outside, similarly as in the above embodiment 1, an abnormality of each tape cartridge can be detected before each tape cartridge is used for an actual operation (before being inserted into the tape drive 320 for reading or writing). Thus, the tape drive that is not abnormal is prevented from being blocked owing to an abnormality of the tape cartridge.

Embodiment 5

In the above embodiment 3, at a timing when a tape cartridge on which reading or writing is performed is ejected from the tape drive 320, it is diagnosed whether or not the ejected tape cartridge is abnormal. However, the embodiment is not limited thereto. The following embodiment 5 will describe an operation of a tape library system when a plurality of tape cartridges are ejected substantially simultaneously.

A configuration of the tape library system according to the embodiment 5 differs from that of the embodiment 3 in the following points.

When receiving notices of completion of ejections of a plurality of tape cartridges, from the robot control module unit 350 within a predetermined set time period, the diagnosis process control unit 241 substantially simultaneously detects ejections of the plurality of tape cartridges. Then, the diagnosis process control unit 241 records the status of any one of the tape cartridges that are ejected from the tape drives 320, as "during diagnosis", and records the statuses of the other tape cartridges as "waiting for diagnosis". For example, the diagnosis process control unit 241 records the status of a tape cartridge for which a notice of completion of ejection is earliest from the robot control module unit 350, as "during diagnosis" such that the status is associated with the individual number of this tape cartridge. Then, for each of the other tape cartridges of which ejections are completed after the earliest tape cartridge, the status is recorded as "waiting for diagnosis" so as to be associated with the individual number thereof. The subsequent operation is the same as in the above embodiment 4.

Figure 11:
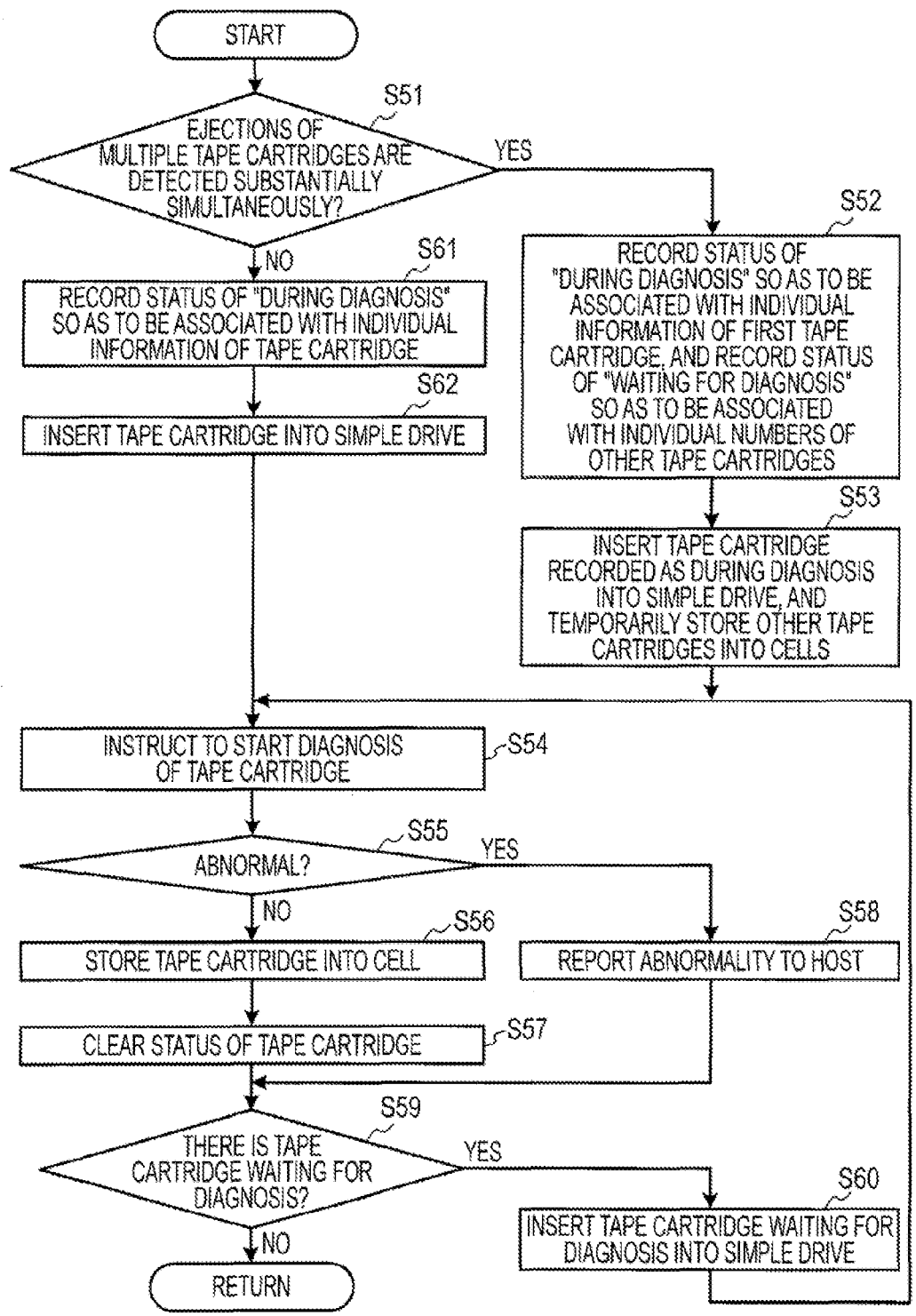
FIG. 11 illustrates a flow of processing performed by a virtual tape apparatus according to an embodiment 5.

FIG. 11 illustrates a flow of processing performed by a virtual tape apparatus according to the embodiment 5. The diagnosis process control unit 241 determines whether or not the number of tape cartridges of which ejections are detected by the robot control module unit 350 is a plural number (S51).

When detecting ejections of a plurality of tape cartridges by receiving notices of completion of ejections of the plurality of tape cartridges from the robot control module unit 350 within a predetermined set time period (Yes at S51), the diagnosis process control unit 241 operates as follows. Specifically, the diagnosis process control unit 241 records the status of any one of the tape cartridges that are ejected from the tape drives 320, as "during diagnosis", and records the statuses of the other tape cartridges as "waiting for diagnosis" (S52).

Then, the diagnosis process control unit 241 sends, to the robot control module unit 350, a command: to insert the tape cartridge whose status is recorded as "during diagnosis", into the diagnosis drive 330; and to temporarily store the other tape cartridges whose statuses are recorded as "waiting for diagnosis", into the cells 340 (S53).

When receiving, from the robot control module unit 350, completion of the insertion of the tape cartridge into the diagnosis drive 330, the diagnosis process control unit 241 instructs the robot control module unit 350 to start diagnosis of the tape cartridge by sending a performance command of abnormality diagnosis to the diagnosis drive 330 (S54).

Then, on the basis of receipt of a response from the diagnosis drive 330, the diagnosis process control unit 241 diagnoses whether or not the tape cartridge is abnormal (S55). In other words, when receiving a notice of completion of the diagnosis from the diagnosis drive 330, the diagnosis process control unit 241 diagnoses the first-diagnosed tape cartridge as not being abnormal (No at S55), and sends, to the robot control module unit 350, a command to store the tape cartridge in the diagnosis drive 330, into the cell 340 (S56). Then, the diagnosis process control unit 241 refers to the status management table 242 and clears the status of the tape cartridge stored into the cell 340 (S57).

On the other hand, for example, when there is no notice of completion of the diagnosis from the diagnosis drive 330 within a predetermined time period, the diagnosis process control unit 241 diagnoses the first-diagnosed tape cartridge as being abnormal (Yes at S55), and reports the abnormality of the tape cartridge along with the individual number of the tape cartridge to the global server 100 (S58).

After clearing the status (S57), or after reporting the abnormality (S58), the diagnosis process control unit 241 refers to the status management table 242 and determines whether or not there is any tape cartridge whose status is "waiting for diagnosis" (S59). As a result of the determination, when there is any tape cartridge whose status is "waiting for diagnosis" (Yes at S59), the diagnosis process control unit 241 sends, to the robot control module unit 350, a command to insert the next tape cartridge whose status is "waiting for diagnosis", from the cell 340 into the diagnosis drive 330 (S60). Then, the diagnosis process control unit 241 repeats the above operations at steps S4 to S10 until no tape cartridge whose status is "waiting for diagnosis" exists.

Here, turning back to the description of S1, when detecting an ejection of a single tape cartridge by receiving a notice of completion of the ejection of the single tape cartridge from the robot control module unit 350 within a predetermined set time period (No at S51), the diagnosis process control unit 241 operates as in the above embodiment 3 (steps S22 to S28 in FIG. 6).

Figure 12:
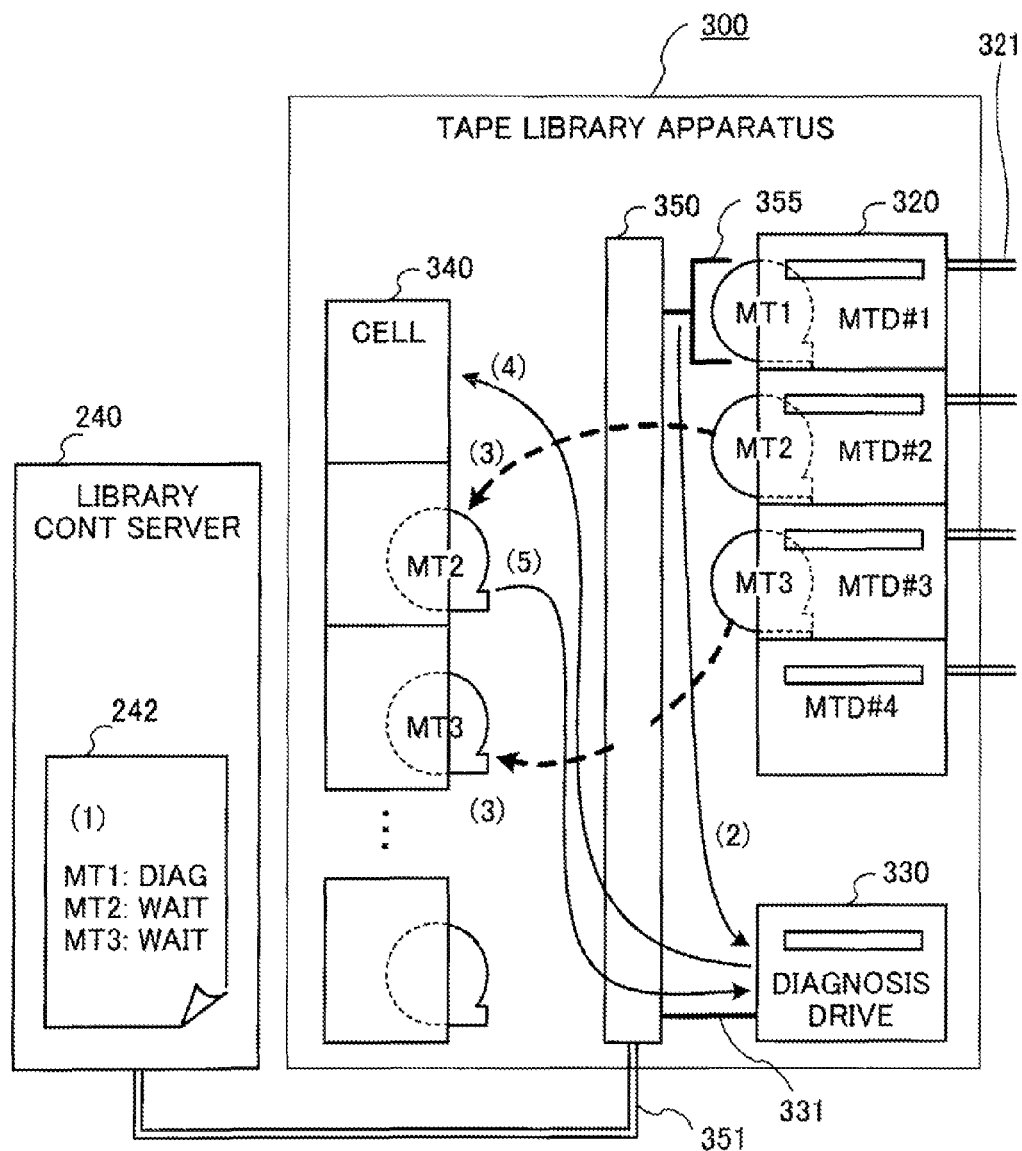
FIG. 12 illustrates an effect achieved by the embodiment 5.

FIG. 12 illustrates an effect achieved by the embodiment 5. As described above, in the embodiment 5, when tape cartridges MT1, MT2, and MT3 are ejected substantially simultaneously from tape drives 320, a status management table 242 is updated such that the tape cartridge MT1 is recorded as "during diagnosis" and the tape cartridges MT2 and MT3 are recorded as "waiting for diagnosis" (see (1) in FIG. 1).

Next, the tape cartridge MT1 is inserted into a diagnosis drive 330 (see (2) in FIG. 12), and the other tape cartridges MT2 and MT3 are temporarily stored into cells 340 (see (3) in FIG. 12). Then, diagnosis is performed as to whether or not the tape cartridge MT1 is abnormal.

When the tape cartridge MT1 is not abnormal, the tape cartridge MT1 is stored into a cell 340 (see (4) in FIG. 12) to be ready for an actual operation (reading or writing) at the tape drive 320. Subsequently, the tape cartridge MT2 is inserted into the diagnosis drive 330 (see (5) in FIG. 12), and diagnosis is performed as to whether or not the tape cartridge MT2 is abnormal. The same operation is repeated until diagnosis of the tape cartridge MT3 is completed.

As described above, according to the embodiment 5, even when a plurality of tape cartridges are ejected substantially simultaneously, an abnormality of each tape cartridge can be detected before each tape cartridge is used next time. Thus, the tape drive that is not abnormal is prevented from being blocked owing to an abnormality of the tape cartridge.

Embodiment 6

The following will describe other embodiments of the tape library system, the tape cartridge diagnosis method, and the tape cartridge diagnosis program, which are disclosed in the application.

Each component of the virtual tape apparatus 200 of the tape library system depicted in FIG. 2 is functionally conceptual, and does not necessarily need to be physically configured as depicted in the drawings. In other words, the specific mode of distribution and integration of the virtual tape apparatus 200 is not limited to the illustrated one, and, for example, the diagnosis process control unit 241 of the library control server 240 is distributed into a diagnosis process control function and a status management table function.

As described above, all or a part of the virtual tape apparatus 200 can be functionally or physically distributed or integrated in an optional unit according to various types of loads and the state of use. In addition, all or some of the processing functions performed on the virtual tape apparatus 200 (see FIGS. 4, 6, 9, and 11, and the like) can be implemented by a CPU and a program analyzed and executed by the CPU, or can be implemented as hardware based on wired logic.

The following tape cartridge diagnosis method is implemented by the virtual tape apparatus 200 described in the above embodiments.

Specifically, a tape cartridge diagnosis method is implemented, which, in a tape library system that has a tape library apparatus and a tape library control apparatus that controls the tape library apparatus, is executed by the tape library control apparatus. In the method, a diagnosis performance control (e.g., steps S3 and S4 in FIG. 4) is executed, in which the tape library control apparatus: inserts a magnetic tape cartridge into a diagnostic magnetic tape device that is provided in the tape library apparatus and is not used for an actual operation; and causes the diagnostic magnetic tape device to perform an diagnostic operation on the magnetic tape cartridge.

Figure 13:
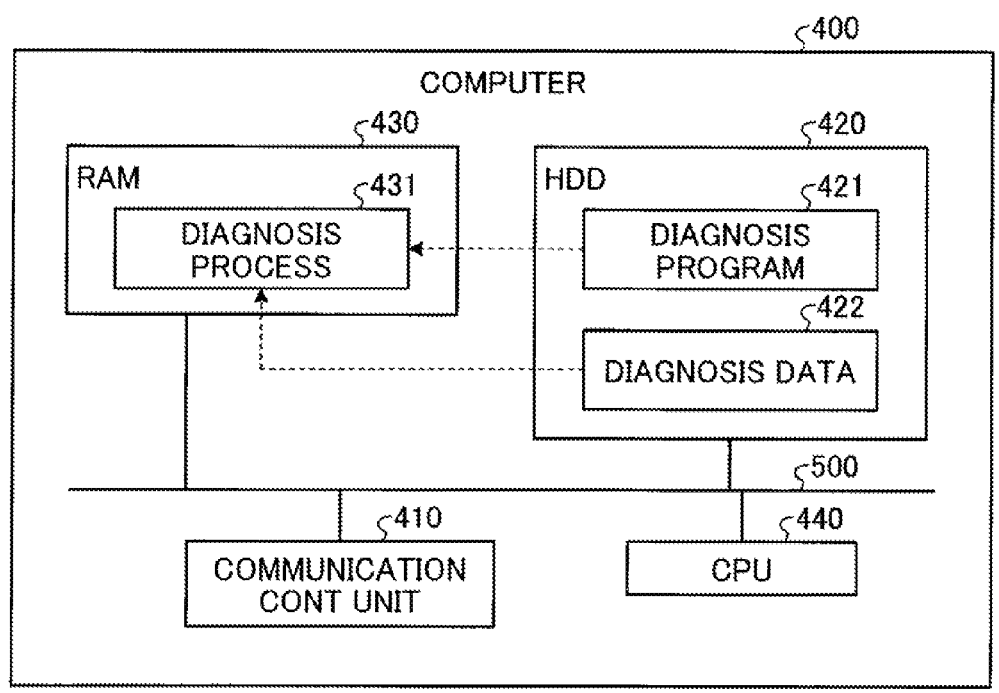
FIG. 13 illustrates a computer that executes a tape cartridge diagnosis program.
Figure 14:
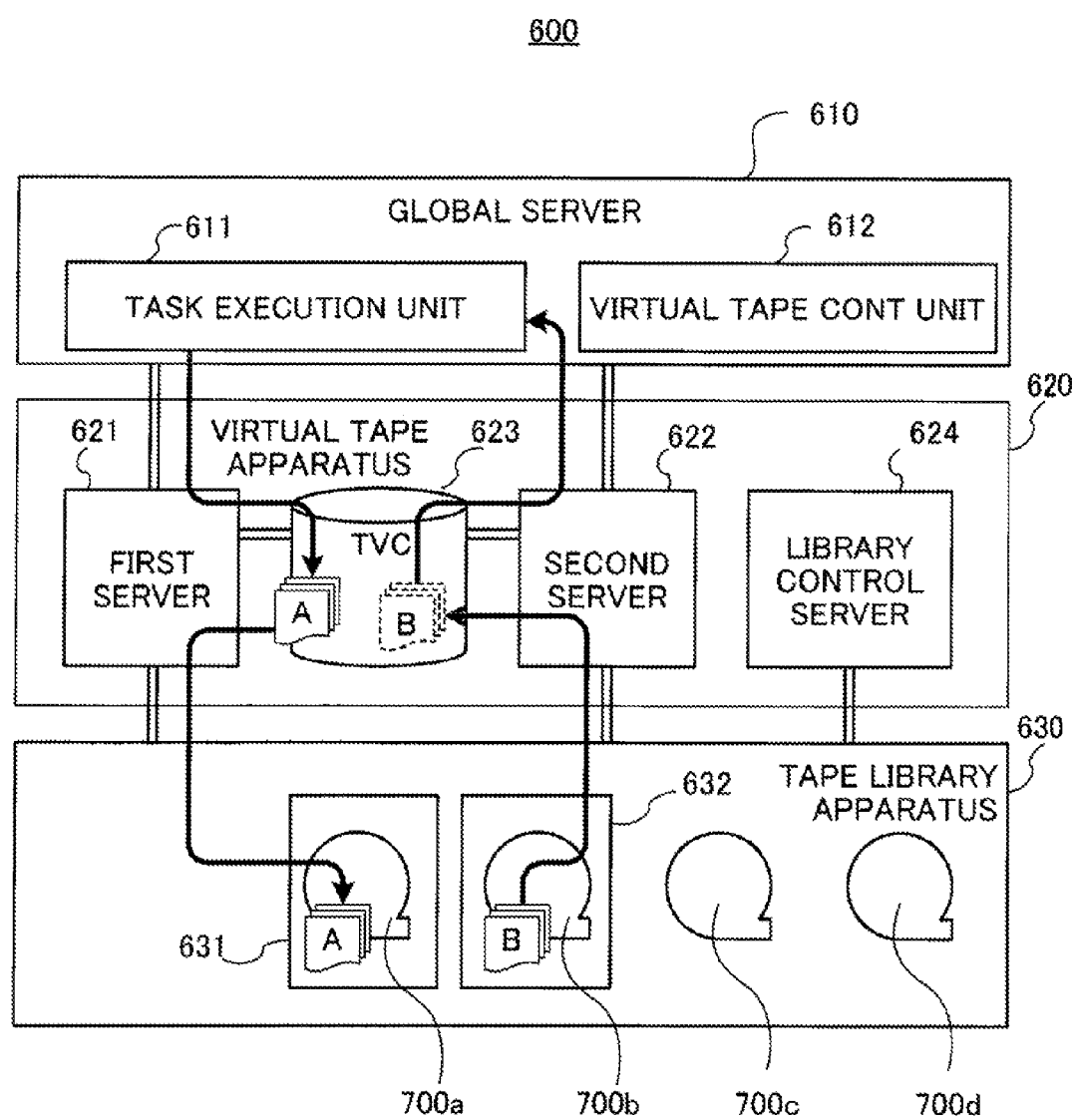
FIG. 14 illustrates a configuration of an existing virtual tape system.
Figure 15:
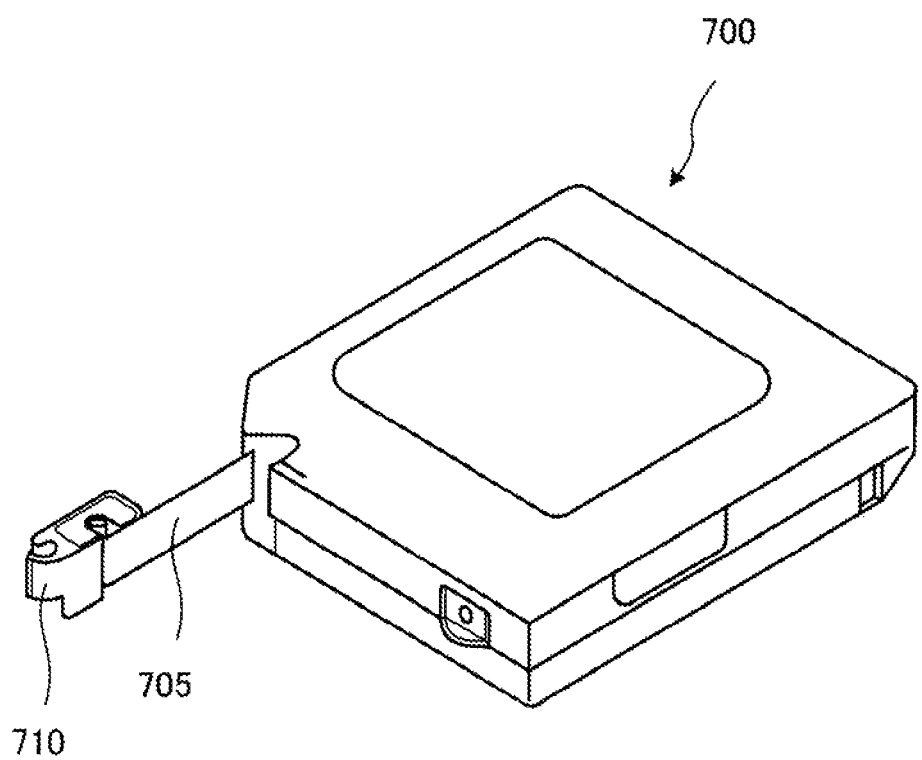
FIG. 15 is an external view of a magnetic tape cartridge.
Figure 16:
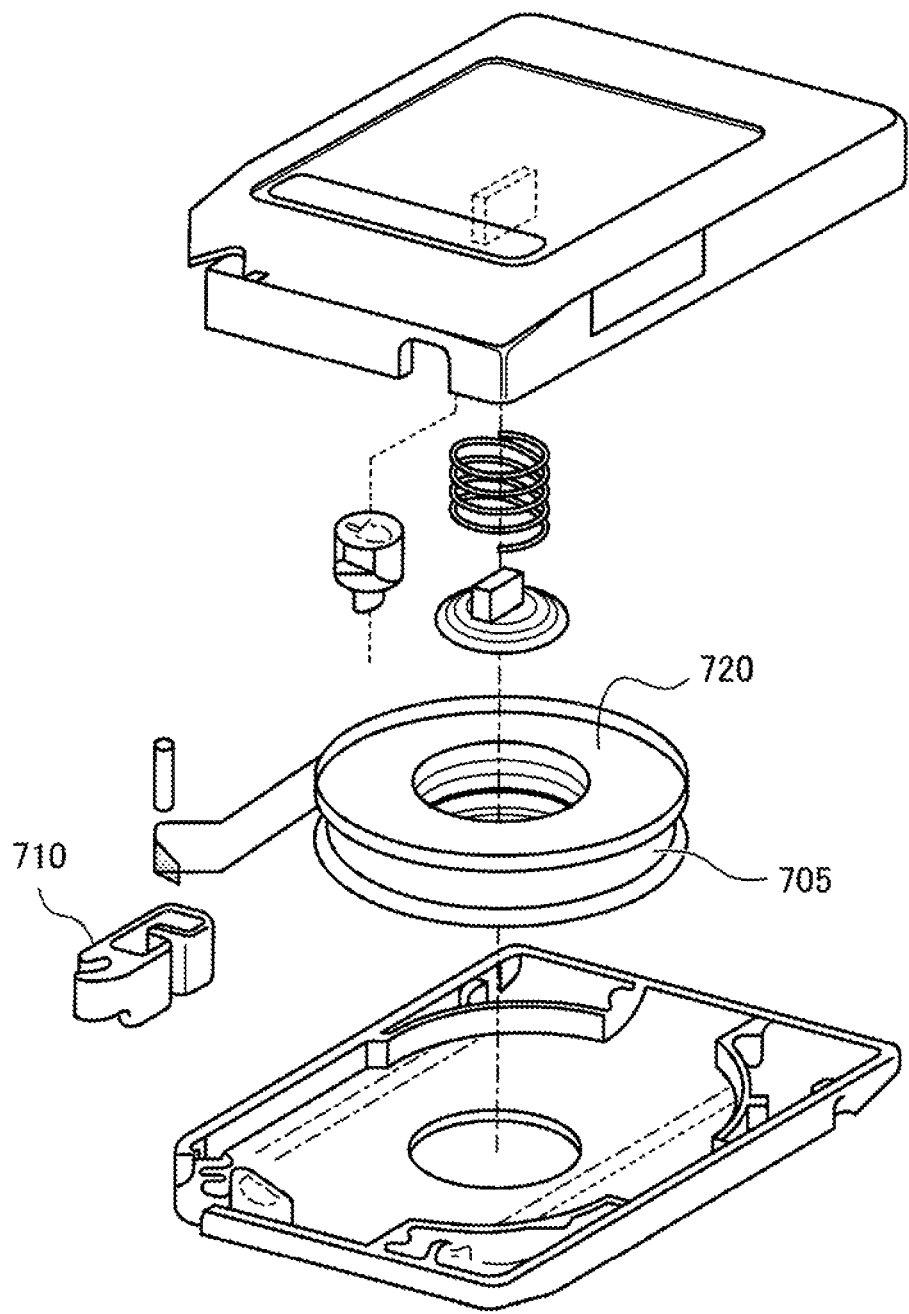
FIG. 16 is a configuration diagram of the magnetic tape cartridge.

Moreover, various processes of the virtual tape apparatus 200 described in the above embodiments (e.g., see FIGS. 4, 6, 9, and 11, and the like) can also be implemented by a previously-prepared program being executed by a computer system such as a personal computer and a work station. With reference to FIG. 13, the following will describe one example of a computer that executes a tape cartridge diagnosis program having the same functions as those of the virtual tape apparatus 200 described in the above embodiments. FIG. 13 illustrates the computer that executes the tape cartridge diagnosis program.

Referring to this drawing, in a computer 400 as the virtual tape apparatus 200, a communication control unit 410, an HDD 420, a RAM 430, and a CPU 440 are connected to each other via a bus 500.

Here, the communication control unit 410 controls communications regarding exchange of various information. The HDD 420 stores information required for the CPU 440 to perform various processes. The RAM 430 temporarily stores various information. The CPU 440 performs various arithmetic processing.

Then, as depicted in FIG. 13, a tape cartridge diagnosis program 421 that implements the same function as that of the library control server 240 of the virtual tape apparatus 200 depicted in FIG. 2, and a tape cartridge diagnosis data 422, are previously stored in the HDD 420. Note that the tape cartridge diagnosis program 421 may be distributed as appropriate and stored in a storage unit of another computer that is communicably connected via a network.

Then, the CPU 440 reads the tape cartridge diagnosis program 421 from the HDD 420 and loads this program into the RAM 430, whereby the tape cartridge diagnosis program 421 serves as a tape cartridge diagnosis process 431 as depicted in FIG. 13.

In other words, the tape cartridge diagnosis process 431 reads the tape cartridge diagnosis data 422 and the like from the HDD 420, stores these data into a region of the RAM 430, which is assigned to the tape cartridge diagnosis process 431, and performs various processes on the basis of the stored data and the like. Note that the tape cartridge diagnosis process 431 corresponds to the processes performed on the library control server 240 (diagnosis process control unit 241 and the like) of the virtual tape apparatus 200 depicted in FIG. 2.

Note that the tape cartridge diagnosis program 421 is not necessarily previously stored in the HDD 420. For example, each program may be stored in a "portable physical medium" that is to be inserted into the computer 400, such as a flexible disc (FD), a CD-ROM, a DVD disc, a magneto-optical disk, and an IC card, or in "another computer (or server)" connected to the computer 400 via a public line, the Internet, a LAN, a WAN, or the like, and the computer 400 may read each program from them for execution.

According to one aspect of the technique disclosed in the application, an abnormality of a magnetic tape cartridge that is attributed to a physical damage, can be detected before the magnetic tape cartridge is actually used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A tape library system comprising:
   a plurality of cartridge cells for accommodating a plurality of tape cartridges respectively, each of the tape cartridges including a tape medium therein;
   a tape drive for writing and reading data to and from the tape cartridge inserted therein;
   a diagnosis drive for diagnosing the tape cartridge inserted therein for physical damage, the diagnosis drive performing a diagnosis operation of loading and unloading of the tape medium in the tape cartridge and transmitting a notice of completion of the diagnosis operation when the diagnosis operation is successfully completed to the unloading;
   a cartridge carriage mechanism for inserting and ejecting the tape cartridge into and from the tape drive and the diagnosis drive; and
   a diagnosis controller for controlling the cartridge carriage mechanism to load the tape cartridge into the diagnosis drive and for controlling the diagnosis drive to diagnose the tape cartridge inserted therein, wherein
   the diagnosis controller controls the diagnosis drive to perform the diagnosis operation, diagnoses the tape cartridge as not being abnormal when receiving the notice of completion of the diagnosis operation from the diagnosis drive, and diagnoses the tape cartridge as being abnormal when not receiving the notice of completion of the diagnosis operation from the diagnosis drive within a predetermined period.

2. The tape library system according to claim 1, further comprising:
   a cartridge entry mechanism for entering the tape cartridge access into the system from an exterior; and wherein when the tape cartridge is entered through the cartridge entry mechanism, the diagnosis controller controls the cartridge carriage mechanism to load the entered tape cartridge into the diagnosis drive.

3. The tape library system according to claim 1, wherein when the tape cartridge is ejected from the tape drive, the diagnosis controller controls the cartridge carriage mechanism to load the ejected tape cartridge into the diagnosis drive.

4. The tape library system according to claim 1, wherein the diagnosis controller controls the diagnosis drives to diagnose an entire tape medium wound within the tape cartridge.

5. The tape library system according to claim 1, wherein after the tape cartridge is diagnosed by the diagnosis drive, the diagnosis controller controls the cartridge carriage mechanism to load the same tape cartridge within a predetermined period and controls the diagnosis drive to diagnose the tape medium of the tape cartridge.

6. The tape library system according to claim 1, further comprising:
a cartridge entry mechanism for entering the tape cartridge access into the system from an exterior; and
wherein after the tape cartridge is entered through the cartridge entry mechanism, the diagnosis controller controls the cartridge carriage mechanism to load the entered tape cartridge into the diagnosis drive within a predetermined period and controls the diagnosis drive to diagnose the tape medium of the tape cartridge.

7. A method of diagnosing a tape cartridge accommodated in a tape library system by a diagnosis controller in the tape library system, comprising:
inserting the tape cartridge into a diagnosis drive in a tape library system for diagnosing the tape cartridge; and
diagnosing the tape cartridge inserted into the diagnosis drive for physical damage, the diagnosing including:
performing a diagnosis operation of loading and unloading of a tape medium in the tape cartridge inserted in the diagnosis drive,
diagnosing the tape cartridge as not being abnormal when receiving a notice of completion of the diagnosis operation from the diagnosis drive, and
diagnosing the tape cartridge as being abnormal when not receiving the notice of completion of the diagnosis operation from the diagnosis drive within a predetermined period.

8. A non-transitory computer-readable medium storing a computer program for a tape library to execute a process for diagnosing a tape cartridge, the process comprising:
inserting the tape cartridge into a diagnosis drive for diagnosing the tape cartridge; and
diagnosing the tape cartridge inserted into the diagnosis drive for physical damage, the diagnosing including:
performing a diagnosis operation of loading and unloading of a tape medium in the tape cartridge inserted in the diagnosis drive,
diagnosing the tape cartridge as not being abnormal when receiving a notice of completion of the diagnosis operation from the diagnosis drive, and
diagnosing the tape cartridge as being abnormal when not receiving the notice of completion of the diagnosis operation from the diagnosis drive within a predetermined period.

* * * * *